Oct. 11, 1949.    H. S. GOLDBERG    2,484,379
IMAGE PROJECTION SYSTEM FOR SPEAKER'S STANDS
Filed Sept. 16, 1947
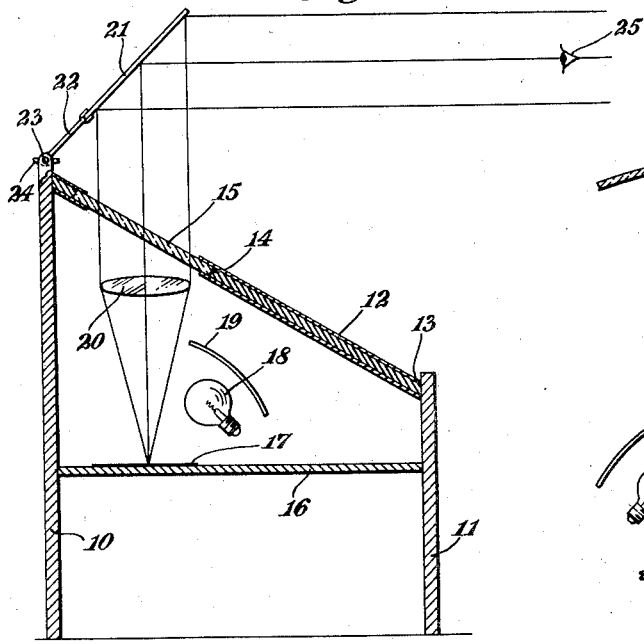
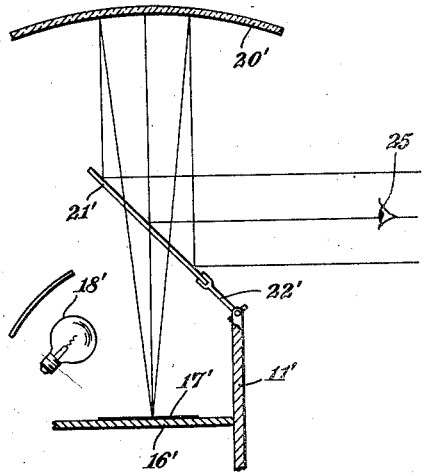
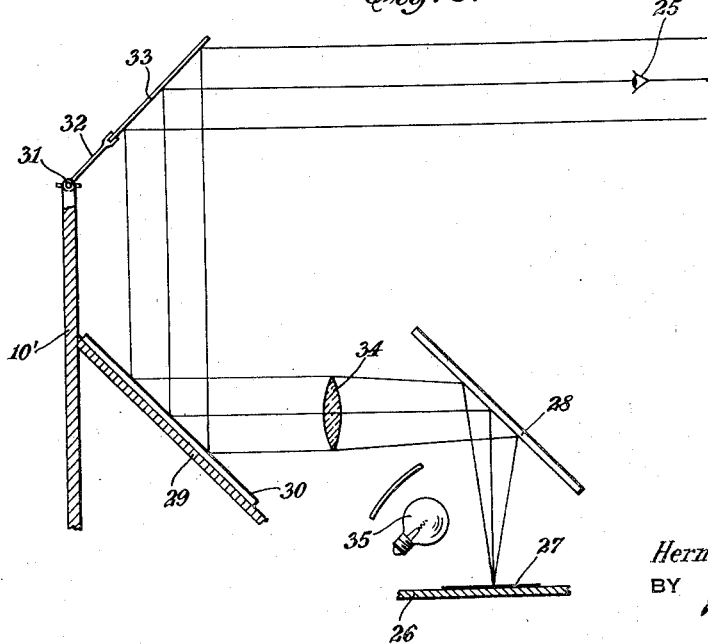
INVENTOR
Herman S. Goldberg.
BY
ATTORNEY Patented Oct. 11, 1949

2,484,379

UNITED STATES PATENT OFFICE 2,484,379

IMAGE PROJECTION SYSTEM FOR SPEAKERS' STANDS

Herman S. Goldberg, Dayton, Ohio

Application September 16, 1947, Serial No. 774,258

3 Claims. (Cl. 88—24)

This invention relates to stands or the like especially adapted for use by speakers, lecturers, conductors, demonstrators, etc., and particularly to a device of that kind provided with an optical system designed to project an image of an object, such as the text, notes, illustrations, music, or any other matter intended to be referred to by a person using the stand, to a point out in space and in front of the stand in such a manner that it may be unobtrusively read or observed by the user, while he addresses the audience, and at the same time enabling him to face and look at the audience, the device being adapted to expose at least the user's face, and perhaps a large portion of his body, to full, unrestricted view of the audience, the image of the matter to be referred to by the user being visible to him only but not to the audience.

One of the important objects of the present invention is to provide a stand for the purpose indicated, which comprises a stand structure having a relatively tall front member and a rear member of lesser height, and wherein the top end of the front member is connected with the top end of the rear member by an inclined, preferably opaque cover, and in which cover is provided an opening in which is held a transparent insert; and wherein below the cover is arranged a fixed platform for the support of the object to be viewed by the user, and wherein at the top end of the front member of the stand structure there is adjustably held a transparent, relatively small reflector which may be set by the user to any suitable position for observing the image of the object to be viewed by him, and wherein an optical system is employed to transmit the image of the object by way of the adjustable reflector to the user's eye.

Another object of this invention is to provide in the above indicated stand an optical system including a light source for illuminating the object to be observed, a magnifying member adapted to transmit an image of such object onto the reflector for the purpose of facilitating distinct vision of the object by the user standing in rear of the stand.

The foregoing and still further objects of the present invention will become more fully apparent from the ensuing description, in conjunction with the accompanying drawing, which latter, although disclosing a few simple forms of the device, are by no means intended in a restricting sense of this invention, and wherein:

Fig. 1 is a diagrammatical illustration of a presently preferred form of a stand employing one type of an optical system for the purpose indicated;

Fig. 2 illustrates a modified form of the optical system for such stand; and

Fig. 3 is still another embodiment of an optical system employable in a speaker's stand.

Before describing the figures in detail, may it be said that optical systems for magnifying, reflecting or otherwise rendering visible various objects to be observed are well known in the art, and no specific claim is made to such optical system per se, except as in their application to a speaker's stand or the like.

Referring now specifically to the figures, in Fig. 1 numeral 10 denotes a relatively tall front member of the stand, while numeral 11 indicates the rear, lower member thereof. It is to be noted that the height of the front and rear members indicated in the drawing may be altered and that there may be provided means for adjusting the height of the entire instrumentality in order to permit its use by persons of different stature. Such arrangement being obvious, no specific illustrations are presented.

Connecting the top ends of the front and rear members is a cover 12, preferably made of opaque material, the cover being so arranged that its lower end terminates somewhat below the upper edge of rear member 11, as indicated at 13. Thus the cover may serve as the support for any material required by the user.

At the upper end of the cover there is provided an opening 14, in which is removably placed a transparent insert 15. Below the cover there is seen a platform 16 for supporting an object 17 to be viewed by the speaker, such as the text of a speech. Conveniently located above object 17 is a light source 18, preferably equipped with a reflector 19 for concentrating light over the surface of the object to thoroughly illuminate the latter.

Just beneath transparent insert 15 there is seen an optical magnifying device 20, such as a lens, by means of which the image of object 17 is transmitted through insert 15 against a transparent reflector 21, mounted in an adjustable holder 22, adapted to pivot at 23 along the top edge of front stand member 10. This holder may be set to any desired position by means of a wing screw 24. Holder 22 is intended to be made of relatively thin material, such as light tubing or rod in order to present as little obstruction to view as possible.

The speaker's eye is indicated at 25. Thus when the speaker stands in rear of the stand, the image of object 17 passing through lens 20 and reflected by transparent reflector 21 is directly visible to the speaker, while the vision of the speaker is by no means interferred with by reflector 21, or its holder 22. By the same token the speaker's face, and even his upper body portion is made readily visible to the audience, since light rays may pass through reflector 21 in both directions, that is in one direction from the audience toward the speaker, as well as in the opposite direction from the speaker towards the audience. It is preferred that reflector 21 is of a relatively small size so that, although not readily visible by the audience, it will in no way impede the visibility both of either the speaker or the audience.

In the modified form shown in Fig. 2 the fragmentally indicated stand discloses rear member 11' and platform 16' upon which rests an image 17' illuminated by light source 18'. In this embodiment of the invention the adjustable holder 22' for transparent reflector 21' is mounted at the upper edge of member 11'. In place of lens 20 of Fig. 1 there is shown a reflector 20' which receives the image of object 17' through reflector 21', enlarges the image and directs it upon reflector 21' and from there the image is reflected towards the speaker's eye.

A somewhat more complex arrangement is indicated in Fig. 3 wherein is employed a front stand member 10', a fixed platform 26 for supporting an object 27 to be observed by the speaker, and above which platform is arranged a reflector 28. Extending from front member 10' is a support 29 upon which rests a reflector 30 which is parallel with reflector 28. Adjustably mounted at 31 is a holder 32 for transparent reflector 33. Arranged between fixed reflectors 28 and 30 is a lens 34. Object 27 is illuminated by a light source 35 and its image is reflected by fixed reflector 28 through lens 34 against fixed reflector 30, and from there against adjustable reflector 33, from where it is directed towards the speaker's eye.

As stated, optical systems, similar to those illustrated and described, in themselves present nothing new in the optical field, however, their employment in combination with a speaker's stand has its distinct advantages.

In all of the illustrations it is to be noted that the projected image seen by the speaker is at infinity, which is also the effective distance between the speaker and his audience. Consequently the speaker is enabled to not only see his notes, but simultaneously face, observe and fully look at the audience without the necessity of ever changing the focus of his eyes or of the direction in which he is looking. Thus the delivery of the speaker's address becomes not only most natural, but infinitely more forceful, as compared with an address by a speaker required to look at notes on the cover or platform of the stand.

While only three specific optical systems are disclosed in conjunction with a speaker's stand, their disclosure clearly indicates the possibility of employing any other suitable optical system applicable to such stand, all within the scope of the present invention as set forth in the annexed claims.

I claim:

1. In a speaker's stand or the like, a stand structure having a fixed support for an object to be rendered visible to an observer standing in rear of the stand, a light source for illuminating such object, a magnifying element for producing an image of such object, a transparent reflector coordinated with said element for receiving, reflecting and rendering visible the image in one direction, that is in the direction of such observer, said reflector being adapted for the passage therethrough of light rays in that one direction as well as in the opposite direction, and an adjustable holder for the reflector to facilitate the positioning thereof.

2. In a speaker's stand or the like, a stand structure including a relatively high front member and a lower rear member, an inclined opaque cover between the members and having a transparent insert at its elevated end, a fixed support beneath the cover, an object to be observed placed upon said support beneath said insert, a light source for illuminating said object, an adjustable mounting located at the upper end of the front member, a transparent reflector held in the mounting substantially above said insert, and a lens interposed between the object and the transparent insert in the cover, and being adapted to project the image of the object through said insert and by way of said transparent reflector toward the speaker standing in the rear of the lower rear member.

3. In a speaker's stand or the like, the combination with a stand structure, of optical means for rendering visible to the speaker, but not to the audience, a hidden object, such as the text for use by the speaker, said optical means being adapted to expose to unrestricted view by the audience of at least the speaker's face, while affording full view of the audience by the speaker, said structure comprising a fixed support for the text to be used, a light source for illuminating the text; said optical means comprising a first fixed reflector above the support, a second fixed reflector distanced from but parallel with the first reflector, a magnifying element between these fixed reflectors and an adjustably mounted transparent reflector of a relatively small size disposed above the second reflector.

HERMAN S. GOLDBERG.

REFERENCES CITED

The following references are of record in the file of this patent:

UNITED STATES PATENTS

| Number | Name | Date |
|---|---|---|
| 1,230,102 | Bottum | June 19, 1917 |
| 1,610,532 | Russel et al. | Dec. 14, 1926 |
| 2,160,202 | Fieux | May 30, 1939 |
| 2,181,134 | Katz | Nov. 28, 1939 |
| 2,313,204 | Morelle | Mar. 9, 1943 |
| 2,358,316 | Chwalow | Sept. 19, 1944 |
| 2,382,631 | Harasta | Aug. 14, 1945 |
| 2,384,643 | Schade | Sept. 11, 1945 |

FOREIGN PATENTS

| Number | Country | Date |
|---|---|---|
| 487,281 | Germany | Dec. 6, 1929 |
| 344,182 | Great Britain | Mar. 5, 1931 |